UNITED STATES PATENT OFFICE.

MORITZ VON GALLOIS, OF HÖCHST-ON-THE-MAIN, GERMANY, ASSIGNOR TO THE FARBWERKE, VORMALS MEISTER, LUCIUS & BRÜNING, OF SAME PLACE.

STABLE DIAZO COMPOUND.

SPECIFICATION forming part of Letters Patent No. 575,228, dated January 12, 1897.

Application filed October 31, 1895. Serial No. 567,546. (No specimens.)

*To all whom it may concern:*

Be it known that I, MORITZ VON GALLOIS, a citizen of the Empire of Austria-Hungary, residing at Höchst-on-the-Main, in the Empire of Germany, have invented certain new and useful Improvements in Methods of Manufacturing Stable Diazo Compounds in Concentrated Liquid or Solid Form, of which the following is a specification.

The method of obtaining azo dyes from their components by combining them in the fiber which came in vogue some years ago is already one of the most important methods of printing and dyeing, but has not yet obtained the importance which it deserves in consideration of the beauty and fastness of the dyeings thus produced, because its development and general application have been retarded by one circumstance.

Since the diazo compounds necessary to the production of the dyes in question cannot be obtained ready made on account of their instability, the dyer or printer is obliged to make the diazo solutions himself every time he requires them, and this inconvenient, expensive, and, for the dyer, often difficult operation is the cause which prevents a more favorable development of the method. It has therefore long been a problem to bring the diazo compounds into a stable transportable form in order to be able to supply the dyer and printer with the ready-made substance. I have obtained this end in an entirely new way.

I have discovered the remarkable fact that the diazo compounds become so stable in presence of an excess of mineral acid—*i. e.*, more acid than is necessary for diazotizing—that they may be continuously subjected to a temperature of about 45° centigrade without noteworthy decomposition, and thus concentrated or evaporated to dryness. In this way I obtain diazo compounds in concentrated or solid form which are very stable, dissolve easily in water, and the solutions of which may be employed without further treatment for the production of the dye on the fiber in the usual manner.

The danger due to the inflammability of the diazo compounds is removed or diminished by mixing them with incombustible substances, such as sulfate of alumina or sodium sufate, or by adding these substances to the solution before evaporating. The concentrated diazo solutions, which are to be used in the form of paste or syrup, are not inflammable, but also in these cases the addition of such a diluent is advisable in order that in the event of the diazo compound becoming dry the inflammability may not exceed the limits of safety. The diazo solutions evaporated to a syrupy consistency may be brought into the form of a dry powder by the admixture of a quantity of a substance which absorbs water—such as anhydrous sodium sulfate or calcined alum.

*Example 1 — Diazoparanitranilin.* — The diazo compound of paranitranilin may be prepared with a small excess of acid, about five per cent. more as the theory requires. Such a solution freshly prepared serves its purpose as a diazo compound completely when used for making dyes. It is, however, not possible to keep the solution, as after standing for some time at the ordinary temperature partial decomposition sets in and a dirty-yellow precipitate is formed. The decomposition progresses rapidly at higher temperatures. The diazo solution behaves quite differently when it is mixed with a considerable excess of acid (about fifty per cent. more than the theory requires) immediately after it has been prepared or when the excess is added before diazotizing. A solution prepared in this way is not only stable at ordinary temperatures, but also at higher temperatures for a relatively long time, and thus its concentration is possible. Fourteen kilograms paranitranilin are diazotized with seven kilograms sodium nitrite and seventeen kilograms sulfuric acid 66° Baumé in the usual way, but in as concentrated aqueous solution as possible. The diazo solution is filtered and concentrated in vacuum apparatus of lead or copper at a temperature not exceeding 45° centigrade. When the concentrated mass has become syrupy or a paste, it is taken out of the apparatus and mixed with an equal quantity, by weight, of anhydrous sodium sulfate or calcined alum, by which means it is obtained in the form of a dry powder, or fifty kilograms of sodium sulfate, respectively, fifteen kilograms of alum, are added to the diazo solution, which is then evaporated to dryness. The concentration of the diazo solution may be carried out with advantage by adding to the diazo solution an acid mineral salt, such as aluminium sulfate or zinc sulfate and then evaporating to dryness. In that case a slight excess of acid is necessary in the above example.

*Example 2 — Diazodianisidin.* — Twenty-five kilograms dianisidin are diazotized with fourteen kilograms sodium nitrite and thirty-five kilograms sulfuric acid of 66° Baumé in the usual manner in as concentrated aqueous solution as possible, and the diazo solution, after being filtered, is evaporated with the addition of sixty kilograms of alum in a vacuum apparatus, with the precaution that the temperature of 45° centigrade is not exceeded. The process is otherwise the same as in the case of paranitranilin.

What I claim as my invention is—

1. The process herein described of manufacturing stable soluble non-explosive diazo compounds of paranitranilin and dianisidin in the form of a paste or powder, consisting in the concentration or evaporation to dryness of diazo solutions of paranitranilin and dianisidin at low temperature in presence of an excess of a mineral acid and in presence of an acid mineral salt, whereby not only the inflammability and explosiveness of the diazo compounds obtained are prevented, but the solutions obtained from the same rendered stable for dyeing and printing purposes, substantially as set forth.

2. As a new product, the paranitro diazo benzol sulfate, combined with an acid mineral salt and evaporated to dryness, said combination being a light, yellow powder, which is stable and non-explosive, easily soluble in water, insoluble in alcohol and benzene, and which when dissolved in water forms together with the alkaline beta-naphthol solution the well-known insoluble paranitranilin red dyestuff, substantially as set forth.

In testimony that I claim the foregoing as my invention I have signed my name in presence of two subscribing witnesses.

MORITZ VON GALLOIS.

Witnesses:
HEINRICH HAHN,
BERNHARD LEYDECKER.